United States Patent
Jordan et al.

[15] 3,646,374
[45] Feb. 29, 1972

[54] THERMOSETTING POLYESTER AND POLYESTER-IMIDE RESINS FOR ELECTRICAL INSULATION

[72] Inventors: Manuel A. Jordan; Edmund J. Zalewski, both of Schenectady; Julian E. Newell, Jr., Scotia, all of N.Y.

[73] Assignee: Schenectady Chemicals, Inc., Schenectady, N.Y.

[22] Filed: Mar. 20, 1970

[21] Appl. No.: 21,352

[52] U.S. Cl. ................................310/45, 117/94, 117/132
[51] Int. Cl. .......................................................H02k 15/12
[58] Field of Search ...............310/45, 215, 216, 43, 214; 117/218, 128.4, 232, 230, 94, 132

[56] References Cited

UNITED STATES PATENTS

| | | |
|---|---|---|
| 2,846,599 | 8/1958 | McAdam .............................310/45 |
| 2,936,296 | 12/1954 | Precopio ............................310/215 |
| 3,122,667 | 2/1964 | Baciu ................................310/215 |
| 3,213,302 | 10/1965 | Barney ..............................310/45 |
| 3,297,785 | 1/1967 | George ..............................117/218 |
| 3,425,866 | 2/1969 | Meyer ...............................117/218 |
| 3,428,486 | 2/1969 | George ..............................117/218 |
| 3,490,143 | 1/1970 | Hull ..................................310/45 |
| 3,493,413 | 2/1970 | Olson ................................117/218 |
| 3,525,889 | 8/1970 | Robinson ...........................310/45 |

*Primary Examiner*—J. D. Miller
*Assistant Examiner*—R. Skudy
*Attorney*—Cushman, Darby & Cushman

[57] ABSTRACT

Improved thermosetting resins for coating and electrically insulating core members of dynamoelectric machine are disclosed. The resins include polyester and polyester-polyimide compositions derived from an alcohol component including tris (2-hydroxyethyl) isocyanurate.

5 Claims, 5 Drawing Figures

PATENTED FEB 29 1972 3,646,374

INVENTORS
MANUEL A. JORDAN
EDMUND J. ZALEWSKI
JULIAN E. NEWELL, JR.

BY Cushman, Darby & Cushman
ATTORNEYS

PATENTED FEB 29 1972 3,646,374
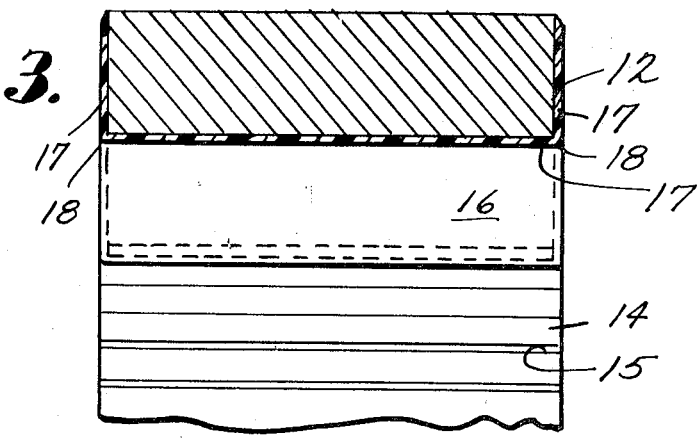
Fig. 3.
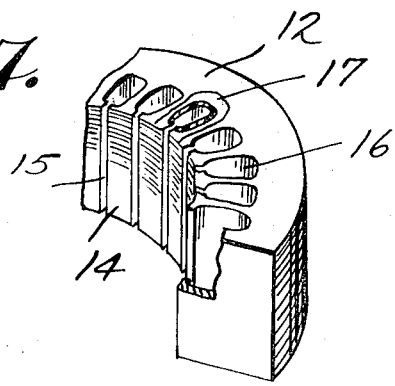
Fig. 4.
Fig. 5.
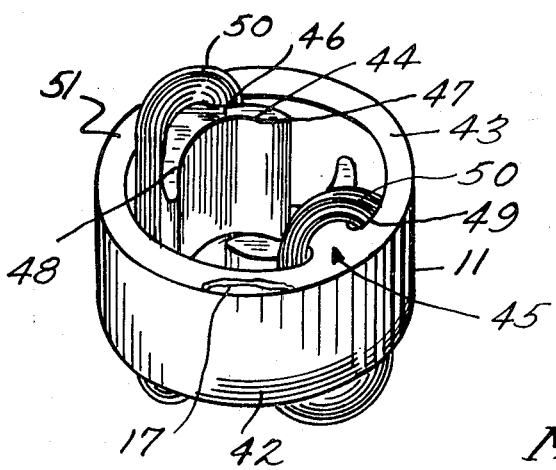
INVENTORS
MANUEL A. JORDAN
EDMUND J. ZALEWSKI
JULIAN E. NEWELL, JR.
BY Cushman, Darby & Cushman
ATTORNEYS

THERMOSETTING POLYESTER AND POLYESTER-IMIDE RESIN FOR ELECTRICAL INSULATION

The invention relates to electromagnetic machines and more particularly to coating the cores of the machines with a thermosetting type insulating material.

Electromagnetic machines customarily include one or more core members such as the stator core and armature core of an electric motor. At least one, and frequently both, the stator and the armature have a plurality of winding slots which allow positioning of magnetic wire windings upon the core member. The core is usually formed of a plurality of thin laminations punched from magnetic steel and therefore generally have burrs and sharp edges thereon which cant cut into the insulation on the wire of the windings and cause short circuiting to ground through the core member.

In prior art motors, separate fabricated slot insulators formed of such materials as kraft paper, cellulose acetate, and other plastic films are used to insulate the coils windings from the core. These individual slot insulators were formed with cuff portions at the opposite sides of the slot to protect the wire windings from abrasion by the sharp edges of the slots in the coil. These separable slot liners add cost to the manufacture of a slotted lamination assembly. Further, in spite of careful installation of such slot insulators, short circuits to ground due to abrasion of the wire windings by the core have continued, especially in circumstances where the insulation will come in contact with chemicals such as Freon and where the insulation is exposed to elevated temperatures for extended periods of time while the motor is in operation.

Applying a coating of thermoreactive material to the slot surfaces and the end surfaces of the core has been proposed as a method of eliminating the separable slot liners (see U.S. Pat. Nos. 2,822,483 and 3,194,993). However, with the prior art coatings such as epoxies, the coating is subject to much faster deterioration than those of the present invention with lengthy exposure to elevated temperatures encountered during the operation of the electrical equipment.

The failure problem is made more acute where the motor is used in an environment containing fluorocarbon chemicals such as difluorodichloromethane, tetrafluorodichloroethane and the like. Continuous operation at elevated temperatures and repeated cycling from hot to cold develops cracks in the coating, and the fluorocarbon chemicals such as the Freons further deteriorate the coating. Eventually, the coating fails and allows the windings to come into contact with the core shorting the motor out.

Another problem is encountered when the cores are coated with the prior art coatings. At the end of each slot there exists a sharp edge as mentioned earlier. When the core is coated with the prior art coatings such as epoxy and other thermosetting resins, the edges remain sharp. These edges abrade the insulation on the wiring of the windings just as if the core had not been coated. This problem has been alleviated by such methods as embossing the end plates of the core so that the sharp edges are avoided. The embossed section is then coated along with the rest of the core with epoxy or other thermosetting resin (see U.S. Pat. No. 3,196,304). Also, multicoating methods have been suggested as in U.S. Pat. No. 2,822,483.

Thus, it would be very desirable if a laminated core structure were provided whereby the slots and ends thereof are coated with an insulative coating which does not deteriorate at elevated temperatures and which also coats the edge of the slot with a single coat done in a single operation in such a manner as to eliminate the sharp edge.

It is therefore an object of this invention to provide an improved laminated core construction for electric inductive devices.

A further object of this invention is to provide for an improved method and material for insulating the slots and ends of a laminated stator or armature core.

Another object of the invention is to provide an improved insulative coating for the slots and ends of a stator or armature coil where the coating applied resists deterioration at elevated temperatures and also forms a smooth, thick, single thickness coating over the edge formed at the end of each slot.

According to the instant invention, an improved core is provided for an inductive device in which a plurality of laminations are stacked in face to face relation with a number of axially aligned slots extending through the stack for accommodating windings. The improvement consists of uniformly coating the slot walls and the side faces of the ends of the core with a thermosetting resin chosen from polyester-polyimide or polyester forming a continuous hardened layer which insulates the core from the windings which are positioned in the slots of the core. The alcohol component used to make the resin preferably includes tris (2-hydroxyethyl) isocyanurate.

The subject matter of this invention is particularly pointed out and distinctly claimed in the concluding portion of this specification. The invention, together with further objects and advantages, may best be understood by reference to the following description taken in connection with the accompanying drawings.

In the drawings:

FIG. 3 is an enlarged cross-sectional view of the stator of FIG. 1 taken along the line III—III.

FIG. 4 is a view in perspective of a part of the stator core of FIG. 1.

FIG. 5 is a view in perspective of a stator core in another form from that shown in FIG. 1 with windings in place.

Figure 1:
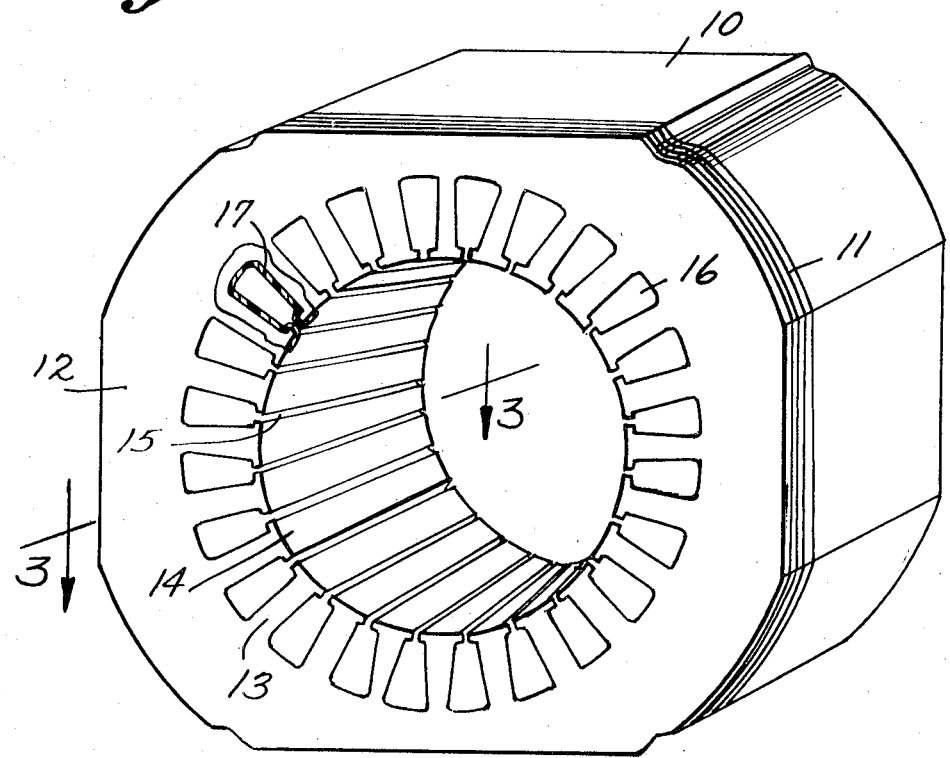
FIG. 1 is a view in perspective of a stator member for use in an electrical motor.

Referring now to FIG. 1 of the drawings, there is shown a stator core, generally identified by numeral 10, formed of a plurality of stacked laminations 11 in face to face engaging relation, each having a generally rectangular outside surface outline with rounded corners and an inside surface consisting of a plurality of equally spaced teeth sections 13 terminating in tips 14. With the laminations 11 assembled in axial alignment, the tips of the teeth define an armature receiving bore and a slot entrance 15. The teeth sections 13 provide a predetermined number of substantially identical oval-shaped winding slots 16 which extend axially through the core.

In the preferred form of the present invention, the surfaces defining the slots 16 and the exposed end faces 12 of the core 10 are coated with an insulating material 17, selected from a polyester or a polyester-polyimide as more fully described below.

FIG. 3 shows a cross sectional view taken along line III—III which runs parallel to slot 16 and also bisects slot 16. The insulating material 17 is shown forming a coating on the wall which forms a slot 16 and on the ends of the stator core 12. As shown, the coating forms a smooth, rounded edge 18 where core ends 12 and the slot walls 16 intersect. This smooth, rounded edge is also shown in FIG. 5 with the wire windings in place, and it can be seen why a smooth, rounded edge is preferable to a sharp edge which can cut into the enamel insulation on the wire windings.

It will be recognized by those skilled in the art that the instant invention is not limited to the type of core shown in FIGS. 1, 4 and 5, but the core may take other structural forms.

Figure 2:
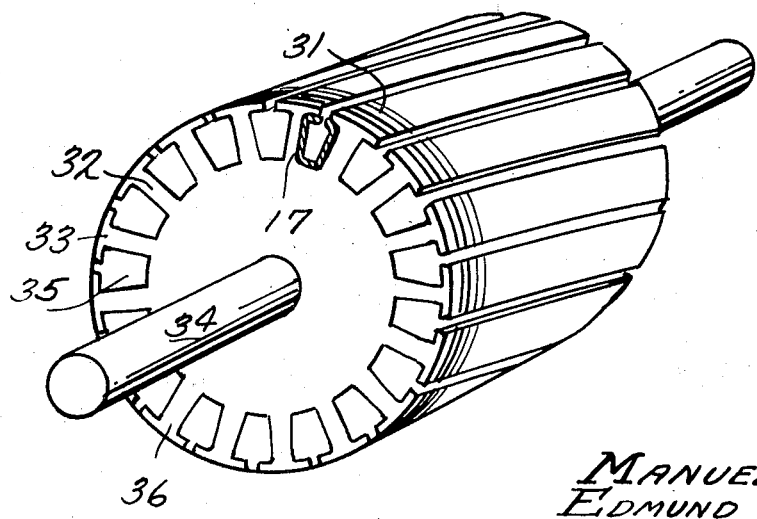
FIG. 2 is a view in perspective of an armature member for use in an electrical motor.

For example, the wire wound armature core, shown in FIG. 2 incorporates the presently preferred form of this invention. The armature core is formed of a plurality of stacked laminations 31 in face to face engaging relation, each having a circular peripheral outline formed from a plurality of equally spaced apart teeth sections 32 terminating in tips 33. The laminated sections are fixed coaxially on a common rotary shaft 34. The sides of the teeth sections 32 provide a predetermined number of substantially identical oval-shaped winding slots 35 which extend axially through the core.

As in the stator member construction of FIGS. 1, 3 and 4, a thin layer of insulating material 17 covers the walls of each slot 35 and the end surfaces of the armature 36.

Another structural form in which the core may take and still be applicable to the present invention is shown in FIG. 5. There is shown a two pole stator member of the salient pole type, especially suitable for use in the construction of alternating current electric motors. The stator member is fabricated from a predetermined number of stacked laminations 42 which are assembled in face to face engaging relation. Each lamination has an annular yoke section 43 and integral teeth or salient pole sections 44 and 45. The pole sections are each formed by a neck portion 46 projecting inwardly from section 43, and a dimensional wider tip portion 47 which terminates in an arcuate edge 48. The laminations are stacked so as to produce axial slots 49 which extend entirely through the stack and accommodate the sides of winding coils 50.

Again, as in the stator member construction of FIGS. 1, 3 and 4, a thin layer of insulating material 17 covers the walls of each slot 49 and the end surfaces 51 of the stator core.

As was mentioned above, the coating applied according to the present invention is a synthetic resinous enamel selected from a polyester or a polyester-polyimide.

The polyester resin is made by reacting tris (2-hydroxyethyl) isocyanurate with terephthalic acid or isophthalic acid or an ester forming derivative of such acids as described in U.S. Pat. Nos. 3,342,780 and 3,249,578. The entire disclosure of U.S. Pat. Nos. 3,342,780 and 3,249,578 is hereby incorporated by reference.

The tris (2-hydroxyethyl) isocyanurate can be employed as the sole polyhydric alcohol or it can be replaced in part by one or more other polyhydric alcohols. As little as 10 percent of the total polyhydric alcohol can be the tris (2-hydroxyethyl) isocyanurate. Likewise, all of the polycarboxylic acid constituent can be terephthalic or isophthalic acid or a portion up to 80 equivalent percent based on a total of 100 equivalent percent of the acid constituent can be a different acid.

In making the polyester, usually 15 to 46 equivalent percent is the carboxylic acid reactant and the balance is the polyhydric alcohol; i.e., there should be an excess of alcoholic groups over acidic groups.

Examples of modifying polyhydric alcohols and polycarboxylic acids are given in U.S. Pat. Nos. 3,249,578 and 3,342,780. The modifying polyhydric alcohols can be ethylene glycol; glycerine; pentaerythritol; 1,1,1-trimethylolpropane; sorbitol; mannitol; dipentaerythritol; $\alpha,\omega$-aliphatic hydrocarbon diols having four to five carbon atoms, e.g., butanediol 1,4; pentanediol 1,5; butene 2-diol 1,4; and butyne-2-diol 1,4 and cyclic glycols, e.g., 2,2,4,4-tetramethyl-1,3-cyclobutanediol, hydroquinole di beta hydroxyethyl ether and 1,4-cyclohexanedimethanol.

The modifying polycarboxylic acid can be either aliphatic or aromatic. Typical examples are adipic acid, ortho phthalic anhydride, hemimellitic acid, trimesic acid, trimellitic acid, succinic acid, tetrachloro phthalic anhydride, hexachloroendomethylene tetrahydrophthalic acid, maleic acid, sebacic acid, etc.

As disclosed in U.S. Pat. Nos. 3,249,578 and 3,342,780, the polyester resin is usually modified by incorporating 1 to 10 percent phenol formaldehyde resins based on total solids and 1 to 25 percent polyisocyanate. In place of, or in addition to the polyisocyanate, there can be incorporated 0.01 to 10 percent of an alkyl titanate based on the total solids of the resinous enamel. Fillers and pigments can also be added to the resin.

The polyester resin and the modifiers are fused together on a two roll heated mill at a temperature of 250° F. until mixed. The mixed resin is removed from the mill, cooled and then ground to a powder.

Typical examples of polyester resins suitable for use in the present invention are given in Examples 1–5.

Unless otherwise indicated, all parts and percentages are by weight.

EXAMPLE 1

| | |
|---|---|
| Ethylene Glycol | 15.2 |
| Tris (2-hydroxyethyl) isocyanurate | 34.4 |
| Terephthalic acid | 50.4 |

The ethylene glycol was charged into the reaction vessel which was equipped with a distillation condenser and heated to a temperature of 180° F., whereupon the tris (2-hydroxyethyl) isocyanurate was charged into the reaction vessel. The batch was heated to a temperature of 340° F., whereupon 23.8 parts of the terephthalic acid was charged to the reaction vessel. The batch is then heated to 400° F. at which point water and ethylene glycol begin to distill off. Distillation was continued until a clear, cold pill of resin was obtained. The batch was then cooled to 350° F., whereupon the remaining 26.6 parts of the terephthalic acid and an amount of ethylene glycol equivalent to that distilled off during the distillation step was added to the reaction vessel. The batch was then reheated and distilled to a temperature of 450° F. The resulting resin was cooled and ground to a fine powder.

EXAMPLE 1A

| | |
|---|---|
| Ethylene glycol | 73.7 |
| Tris (2-hydroxyethyl) isocyanurate | 170.4 |
| Terephthalic acid | 244.6 |
| -Toluene Sulfonic acid (catalyst) | 0.27 |

The reaction procedure was the same as in Example 1 except that the catalyst was charged into the reaction vessel with the ethylene glycol, and the terephthalic acid was charged in two equal amounts, that is 122.3 parts for the first addition and 122.3 parts for the second addition.

EXAMPLE 2

| | |
|---|---|
| Resin of Example 1 | 1200 |
| Phenolic resin | 183 |
| Tetraisobutyl titanate | 31.5 |

The above materials were fused together on a two roll heated mill at a temperature of 250° F. until mixed. The mixture was then removed, cooled and ground to a powder. The phenolic resin used in the above example and in the following examples was prepared from metapara cresol and formaldehyde as shown in Example 8 of U.S. Pat. No. 3,249,578.

EXAMPLE 3

| | |
|---|---|
| Resin of Example 1 | 933 |
| Phenol blocked trimer of tolylene diisocyanate | 114 |
| Phenolic resin | 103 |
| Tetraisobutyl titanate | 24.5 |
| Silicon dioxide | 554 |
| Titanox RCHT | 92 |
| Iron oxide pigment | 92 |
| SR-82 Silicone (dimethyl siloxane polymer) | 2.5 |

The above materials were mixed and ground to a powder using the same procedure as given in Example 2. The silicon dioxide used in this example and in the following examples was produced by Pennsylvania Glass Sand Corp. and marketed under the name of Berkeley Super Sil 325. The Titanox RCHT used in this and following examples is a titanium dioxide. The SR-82 Silicone used in this and following examples is a flow promoting agent marketed by the General Electric Company.

EXAMPLE 4

| | |
|---|---|
| Resin of Example 1 | 675 |
| Silicon dioxide | 450 |
| Iron oxide pigment | 75 |
| Titanox RCHT | 75 |
| Epoxy resin | 225 |
| SR-82 Silicone | 2 |

The above materials were mixed and ground to a powder using the same procedure as given in Example 2. The epoxy resin used in this example and following examples is an epoxy resin based on Bisphenol A and Epichlorohydrin and is marketed under the name Epon 1004.

EXAMPLE 5

| Resin of Example 1 | 450 |
|---|---|
| Silicon dioxide | 315 |
| Iron oxide pigment | 52.5 |
| Titanox RCHT | 52.5 |
| Epoxy resin | 150 |
| Phenol blocked trimer of tolylene diisocyanate | 30 |

The above materials were mixed and ground to a powder using the procedure as given in Example 2.

The polyester-polyimide coating resins used in this invention are prepared from tris (2-hydroxyethyl) isocyanurate, a polycarboxylic acid, e.g., terephthalic acid or isophalic acid, an aromatic diamine, e.g., oxydianiline or methylene dianiline and an aromatic carboxylic anhydride containing at least one additional carboxy group, e.g., trimellitic anhydride or pyromellitic anhydride as described in U.S. Pat. No. 3,426,098, the entire disclosure of which is hereby incorporated by reference.

The polymide can be performed and then the polyester forming components added or all of the components can be added together.

The polyimide can be from 5 to 50 percent of the total of polyimide and polyester. The polyimide forming components, i.e., the various anhydride and polyamines which can be used are enumerated in U.S. Pat. no. 3,426,098. As such components there can be used (a) anhydrides such as trimellitic anhydride pyrommellitic dianhydride, benzophenone 2,3, 3',3'-tetracarboxylic dianhydride, 2,3,6,7-naphthalene dianhydride and 3,3,40 ,4,4'-diphenyl tetracarboxylic dianhydride and (b) polyamines, preferably aromatic amines, including methylene dianiline, benzidine, 3,3'-diaminodiphenyl, 1,4-diamino naphthalene, p-phenylene diamine, Δ,ω-nonamethylene diamine, 4,4'-diaminodiphenyl ether, 4,4-dimethyl heptamethylene diamine-1,4, diaminodiphenyl ketone, bis-(4-aminophenyl)-Δ,Δ'-p-xylene, m-phenylene diamine, xylene diamine, hexamethylene diamine, ethylene diamine, 4,4'-dicyclohexylmethane diamine, diaminodiphenyl sulfone.

The polyester forming ingredients are the same as given above for the polyester resin.

The polyester polyimide resins are usually modified by the same modifiers and additives as disclosed earlier for the polyester resins.

Typical examples of polyester-polyimide resins suitable for use in the present invention are given in Examples 6 through 8.

| Example 6 | |
|---|---|
| Ethylene glycol | 175 |
| Tris (2-hydroxyethyl) isocyanurate | 715 |
| Trimellitic anhydride | 461 |
| Methylene dianiline | 240 |
| Terephthalic acid | 523 |

The ethylene glycol was charged into the reaction vessel which was equipped with a distillation condenser and heated to a temperature of 180° F., whereupon the tris (2-hydroxyethyl) isocyanurate was charged into the reaction vessel. The batch was heated to a temperature of 325° F., whereupon the terephthalic acid was charged in the reaction vessel. The batch was then heated to 420° F., at which point water began to distill off. Distillation was continued until the batch was clear and 102 cc. of water had distilled off. By this time, the reaction temperature had reached 440° F. The reaction batch was cooled to 420° F. and the trimellitic anhydride and methylene dianiline were charged to the reaction vessel. The batch was then reheated to a temperature of 440° F. and water was allowed to distill off until the batch cleared. The batch was held at distillation temperature until a Z1-Z2 viscosity at 30 percent in cresylic acid. The resulting resin was cooled and ground to a fine powder.

| Example 7 | |
|---|---|
| Resin of Example 6 | 820 |
| Phenol resin | 102 |
| Phenol blocked trimer of tolylene diisocyanate | 122.5 |
| Tetraisobutyl titanate | 38.7 |

The above materials were mixed and ground to a powder using the same procedure as given in Example 2.

| Example 8 | |
|---|---|
| Resin of Example 6 | 542 |
| Phenolic resin | 68.7 |
| Silicon dioxide | 285 |
| Titanox RCHT | 47.3 |
| Red oxide | 47.3 |
| Phenol blocked trimer of of tolylene diisocyanate | 54.2 |
| Tetraisobutyl titanate | 11.4 |

The above materials were mixed and ground to a powder using the same procedure as given in Example 2.

All of the resins described in the above examples were coated on ¾-inch key stock. The preferred coating procedure will be described in the latter part of this disclosure. All of the resins tested showed good flow requirements (smooth film), impact resistance (30 in. lb.) and good corner coverage. In addition, stators and armature coated with the products of Examples 7 and 8 exhibited resistance to Freon 22 (chlorodifluoromethane) after exposure for 24 hours at 150 lbs. pressure and heated in an oven for 15 minutes at 300° F. upon removal from the Freon. As shown in the examples of the specification fillers and pigments are used in a range of from 43 to 47 percent based on the total tris (2-hydroxyethyl) isocyanurate containing resin, fillers and pigments.

The resins described in the above examples exhibit very good thermal resistance and other physical properties when used to coat the slots of armatures and stators. Coils and the core windings can also be coated with these resins, thus obtaining a structural coating over these parts to form a barrier against dirt and moisture. Furthermore, these resins serve as a bonding medium to hold the wires in the windings and to prevent movement during operation of the electrical equipment. The products of the invention are resistant to chlorofluorohydrocarbons such as chlorotrifluoromethane, dichlorodifluoromethane, chlorodifluoromethane, dichlorotetrafluoroethane, trichlorotrifluoroethane.

The resinous coatings of this invention can be applied to the stator or armature by several methods. The resinous coating can be applied by conventional fluidized bed technique or by blowing resinous powder onto the heated article. Both of these methods require the article to be preheated, coated and post-baked after the coating operation. The resinous coating can also be applied by electrostatic deposition.

The electrostatic method does not depend upon the heat of the article being coated to make the particles adhere to the article, but rather the particles uniformly adhere to the article due to electrostatic attraction of negative particles to the grounded article. The stator or armature which has been electrostatically coated is then heated to a temperature where the resinous particles melt and flow evenly over the coated area. The sharp edges receive a thick, smooth coating and areas which are not to be covered can simply be masked during the electrostatic coating step. Thus, the electrostatic process eliminates the preheating steps of the earlier mentioned processes, produces a more uniform coating and a thick, smooth coating of sharp edges, and also, selective coating is possible by simply masking the areas not to be coated during the electrostatic coating step.

The resins described in the above examples exhibit very good thermal resistance and other physical properties when used to electrostatically coat slots of armatures and stators. The coatings are uniform and have a very smooth surface which forms a smooth, thick coated edge at the ends of the slots in the armature or stator. Coils and motor windings can also be electrostatically coated with these resins, thus obtaining a structural coating over these parts to form a barrier against dirt and moisture. Furthermore, these resins serve as a bonding medium to hold the wire in the windings, to prevent movement during operation of the electrical equipment. It is also possible by the electrostatic process to selectively coat the magnetic wire after it has been positioned in the windings with the resins described in the above examples.

Obviously, many modifications and variations of the present invention are possible in the light of the above teachings. It is, therefore, to be understood that within the scope of the appended claims, the invention may be practiced otherwise than specifically described.

The invention is defined in the claims which follow.

What is claimed is:

1. A core member for a dynamoelectric machine having end surfaces and wall surfaces defining a plurality of arcuately spaced winding slots therein having rough, sharp edges formed at the intersections of the end surfaces and wall surfaces, said end surfaces, wall surfaces and rough, sharp edges being coated with a thermosetting polyester-imide resin of (1) tris (2-hydroxyethyl) isocyanurate, (2) a member of the group consisting of terephthalic acid and isophthalic acid, (3) ethylene glycol, (4) trimellitic anhydride and (5) a member of the group consisting of methylene dianiline and oxydianiline.

2. A core member as in claim 1 where the thermosetting resin contains from 43 to 47 percent fillers and pigments based on the weight of resin comprising tris (2-hydroxyethyl) isocyanurate, fillers and pigments.

3. A core member as in claim 1 in the form of a stator.

4. A core member as in claim 1 in the form of a rotatable armature.

5. A core member as in claim 1 having in addition wire windings in the winding slots which are coated with the same thermosetting resin used to coat the core member.

* * * * *